United States Patent [19]
Moehrmann

[11] Patent Number: 5,509,077
[45] Date of Patent: Apr. 16, 1996

[54] METHOD FOR DATA SECURITY IN A DIGITAL TELECOMMUNICATION SYSTEM

[75] Inventor: Karl-Heinz Moehrmann, Munich, Germany

[73] Assignee: Siemens Aktiengesellschaft, Munich, Germany

[21] Appl. No.: 235,923

[22] Filed: May 2, 1994

[30] Foreign Application Priority Data

Jun. 30, 1993 [EP] European Pat. Off. .............. 93110455

[51] Int. Cl.$^6$ .............................. H04L 9/30; H04N 7/167
[52] U.S. Cl. .................. 380/30; 380/9; 380/10; 380/20; 380/21; 380/49
[58] Field of Search ..................... 380/9, 10, 20, 380/21, 30, 43, 7, 49, 54

[56] References Cited

U.S. PATENT DOCUMENTS

| | | | |
|---|---|---|---|
| 5,159,633 | 10/1992 | Nakamura .................. | 380/30 |
| 5,253,293 | 10/1993 | Shigemitsu et al. ........ | 380/9 |
| 5,282,249 | 1/1994 | Cohen et al. ............... | 380/30 X |

FOREIGN PATENT DOCUMENTS

| | | | |
|---|---|---|---|
| 3925605 | 2/1991 | Germany ................ | H04L 12/22 |
| 4204461 | 7/1993 | Germany ................ | H04L 9/30 |

OTHER PUBLICATIONS

"Implementation of a TDM Passive Optical Network for Subscriber Loop Applications", IEEE Journal of Lightwave Technology, vol. 7, No. 11, Nov. 1989, pp. 1752–1758.

"Ein Kryptographisches Systemkonzept Für Pay–TV Mit Kezentraler Schüsselverwaltung", Von Leo Danilenko, Rundfunktechnische Mitteilungen, vol. 29, No. 6, (1989), pp. 298–303.

"Novel Sampling Technique for Digital Video Demultiplexing, Descrambling and Channel Selection", Electronics Letters, vol. 24, No. 11, May 26, 1988, pp. 654–656.

"Kryptografie in der Telematik", ntz Sonderheft ISDN-Kommunikationsanlogen vol. 38 (1985) No. 9, pp. 636–638.

"A Method for Obtaining Digital Signatures and Public–Cryptosystems", R. L. Rivest et al. Communications of the ACM, vol. 21, No. 2, Feb. 1978, pp. 120–126.

"A Broadband Subscriber Network Using Optical Star Couplers", Tokura et al, IEEE/IEICE Global Telecommunications Conf., (1987), pp. 1439–1443.

Abstract of Japanese Patent 61–72437, Published 14 Apr. 1986.

Primary Examiner—Bernarr E. Gregory
Attorney, Agent, or Firm—Hill, Steadman & Simpson

[57] ABSTRACT

For data security in a pay-TV system, a public key is respectively calculated from a secret key prescribed for pay-TV receiver by A program purveyor. This public key is utilized in the program distribution center for encoding secondary key information for matching the pay-TV receiver to transmission modalities that are repeatedly modified and that are provided for the pay-TV receiver in the program distribution center. The program purveyor can prescribe new keys from time to time. The initial settings of scramblers and descramblers can be modified as transmission modalities.

9 Claims, 2 Drawing Sheets

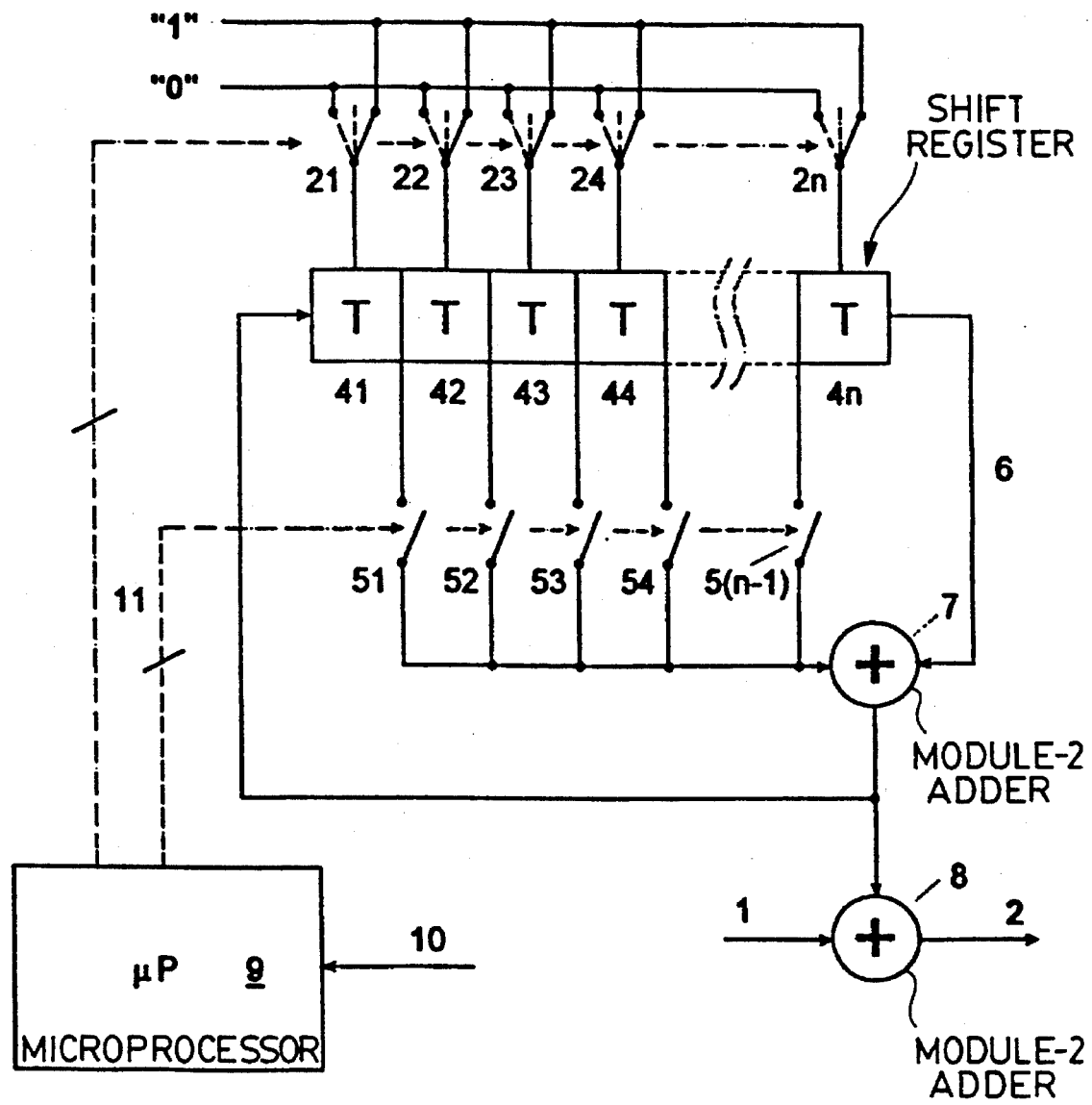

METHOD FOR DATA SECURITY IN A DIGITAL TELECOMMUNICATION SYSTEM

BACKGROUND OF THE INVENTION

In optical double-star networks formed with passive fiber branchers, wherein every decentralized telecommunication equipment receives the downstream information transmitted by the central telecommunication equipment and only sorts the information intended for it out of this downstream information for the purpose of forwarding to the connected subscriber or subscribers, there is the possibility of an access to information that is intended for other subscribers who are connected to other decentralized telecommunication equipment.

For a telecommunication system wherein a plurality of subscriber locations are connected with light wave guide subscriber lines via one or more optical brancher equipment to a light wave guide link connected to a switching center, whereby one or more subscriber locations can be connected to an optical brancher means, it has already been disclosed (see German reference DE-C2-39 25 605) to counter this that a respective circuit is provided in the subscriber locations that initiates a coding key during the call set up between the subscriber location and the switching center. The coding key is transmitted to the switching center, whereupon the digital signals to be transmitted from the switching center to the subscriber location are transmitted in coded form using this coding key. This known solution, which also functions in the transmission of ATM cells, does not (in that the key to be employed is transmitted from the decentralized telecommunication equipment to the centralized equipment at the beginning of the transmission) preclude with certainty that an unauthorized person who obtained access to this key either intentionally or unintentionally (even if only because of a malfunction of the electronic equipment in the network), can thus also decode the encoded downstream signals. Furthermore, the risk of an unauthorized decoding also increases when a connection exists for a long time (such as, for example, a point-to-point dedicated line), since the unauthorized person has adequate time to effect the decoding.

A more effective protection of a passive optical telecommunication system against unauthorized access onto the digital signals transmitted therein is provided by a method for data securing as disclosed in German reference DE-C1-42 04 461 for a telecommunication system having a central telecommunication equipment and a plurality of decentralized telecommunication equipment. Each of the equipment is respectively connected via its own light wave guide link to an optical brancher that is connected either directly or via at least one further optical brancher to a common light wave guide terminal of the central telecommunication equipment via a light wave guide bus. The signal transmission proceeding from the central telecommunication equipment to the decentralized equipment is undertaken in a multiplex frame or in an ATM cell stream. The signal transmission proceeding from the decentralized telecommunication equipment to the centralized equipment is respectively undertaken in a time channel of the multiplex frame allocated to the respective decentralized equipment, preferably upon adaptive control of the time slot of the time channel, proceeding in a TDMA method or, respectively, with ATM cells in a TDMA method. According to this method, a public key is calculated from a secret key prescribed in a decentralized telecommunication equipment, this public key being communicated in an upstream direction to the central telecommunication equipment where it is used for encoding (secondary key) information for the adaptation of the decentralized equipment to repeatedly modified transmission modalities that are individually provided in the central equipment for this decentralized equipment.

SUMMARY OF THE INVENTION

The problem of unauthorized access to digital signals transmitted in a telecommunication system, however, exists not only in passive optical networks (PON) of the type identified above, but also occurs generally in telecommunication technology, for example, given a TV program distribution of pay-TV programs. The present invention provides effective protection against unauthorized access of pay-TV program signals.

The present invention is directed to a method for data security in a digital telecommunication system having a central telecommunication equipment and a plurality of decentralized telecommunication equipment, particularly B-ISDN telecommunication system, wherein the signal transmission proceeding from the central telecommunication equipment to the decentralized equipment proceeds on the basis of ATM cells. This method is inventively characterized in that, given pay-TV distribution on the basis of ATM, a public key fitting a secret key prescribed at a pay-TV receiver is used in the program distribution central for encoding (secondary key) information for adapting the pay-TV receiver to repeatedly modified transmission modalities that are provided in the program distribution central for the pay-TV receiver.

The present invention, which makes use of what is referred to as a public key system in the encoding of the transmission modality information, has the advantage of being able to forego a transmission of secret keys and to nonetheless guaranty a high security of the digital signals transmitted from the program distribution central to the pay-TV receivers against unauthorized access and eavesdropping. This holds true even for relatively long-lasting connections. The required calculating outlay for a public key method is in fact high. Since the encoded communication of new transmission modalities, however, is only occasionally necessary, namely in conjunction with a modification of such modalities implemented at certain chronological intervals by the program distribution central, the calculating of keys and the encoding are not time-critical, so that they can be effected off-line by software with a relatively simple arithmetic unit.

Let it be pointed out here that it is known (from patents abstracts of Japan, E-429, 19 Aug. 1986, Vol. 10, No. 240 (JP-A-61-72 437)) that public and secret keys can be employed for telecommunication between decentralized communication equipment. The decentralized communication equipment fetch the public keys of their communication partner from a central key management means that thereby individually encodes identifiers of the decentralized equipment. Other than this aspect, this prior art is not relevant to the present invention.

For actual protection of the ongoing digital signal stream, the initial setting and/or the structure of a scrambler provided in the program distribution central and of a descrambler provided in the pay-TV receiver can be repeatedly modified in a further development of the present invention. The program distribution central respectively calculates a random, new initial setting and/or structure for the scrambler on the basis of a random number generator and communicates one appertaining initial setting and/or structure of the descrambler to the appertaining pay-TV receiver encoded with a public key that fits the secret key provided at the respective pay-TV receiver. The pay-TV receiver decodes this message with the appertaining secret key, whereupon the modification is implemented beginning with a specific pulse frame. In other words, upon transmission of ATM cells, the useful signal contained in the cell is scrambled in the program distribution central and only a pay-TV receiver forming the destination of the ATM cell knows how the signal is to be descrambled, since the initial setting and/or the structure of the scrambler required at the beginning of the useful information part (payload) of the cell was communicated only to this pay-TV receiver encoded in a way it can understand. The transmission modalities for various pay-TV receivers or groups of pay-TV receivers can be modified at various points in time in a further development of the present invention, this further complicating access.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 shows an exemplary embodiment of a circuit for the repeated modification of the scrambler or, respectively, descrambler.

DESCRIPTION OF THE PREFERRED EMBODIMENT

Figure 1:
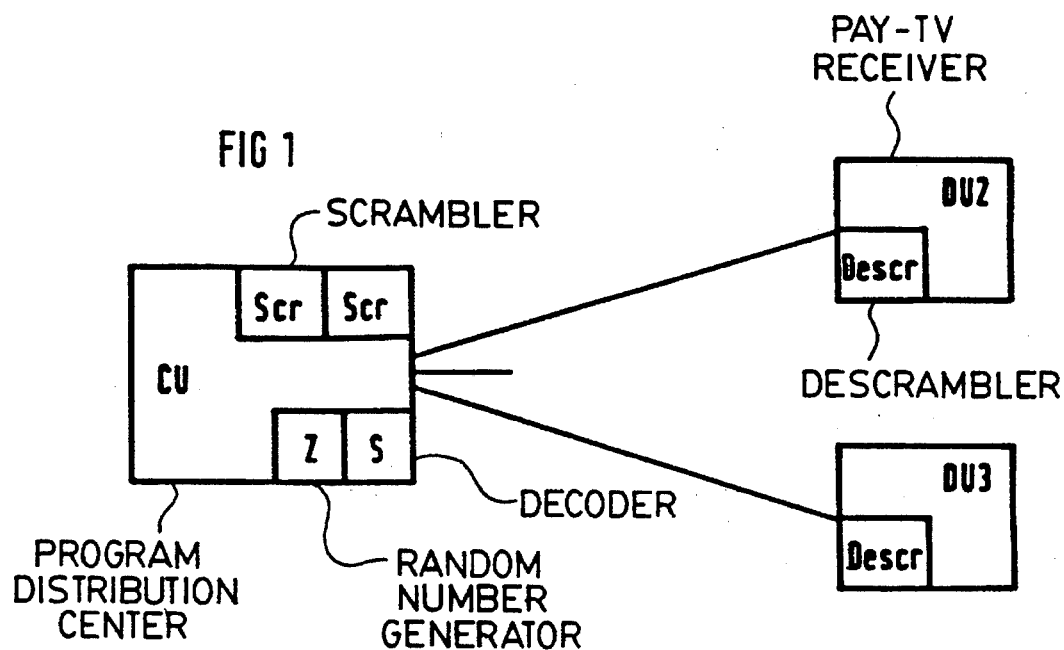
FIG. 1 schematically shows an exemplary embodiment of a telecommunication system in a scope required for an understanding of the present invention, and having a central telecommunication means CU for TV program distribution and a plurality of decentralized telecommunication equipment . . . , DU2, DU3, . . . in the form of pay-TV receivers.

As known in and of itself, the signal transmission in the telecommunication system outlined in FIG. 1 can proceed with ATM cells. Every ATM cell (covering 53 bit octets) is composed of a (5-octet) control information field (header) and of a useful information field (covering 48 octets). What is referred to as the virtual path identifier is part of the header (and covers 16 bits); another part of the header is what is referred to as the access control field.

When useful information is not to be transmitted at the moment, synchronizing cells having a prescribed bit pattern can be mixed into the ATM cell stream for the synchronization of the subscriber locations to the respective cell start (what is referred to as pure ATM). However, it is also possible that the ATM cell stream is in turn embedded in a time frame structure (for example, a STM-1 time frame structure) having synchronizing signals (overhead) occurring at specific, fixed intervals (what is referred as frame-structure ATM). Each subscriber equipment takes only those ATM cells from the ATM cell stream that are addressed in their header, preferably in the virtual path identifier thereof, with an identifier allocated to precisely this subscriber equipment.

As indicated in the drawing, the pay-TV receivers . . . DU2, DU3, . . . are each respectively provided with a descrambler Descr that descrambles the TV program digital signal scrambled in the program distribution center CU and intended for the appertaining pay-TV receiver. The program distribution central CU has a respectively separate scrambler . . . , Scr2, Scr3, . . . per pay-TV receiver . . . , DU2, DU3, . . . for scrambling. This need not be realized in hardware but can be realized with software or with a single switchable hardware structure. The scrambling, for example, can proceed in the form of a continuous module-2 addition of the information bits with a random-like bit sequence. There are many possibilities for generating such bit sequences, one being set forth in greater detail with reference to FIG. 2.

The scrambler and descrambler are repeatedly modified. To that end, the necessary initial setting for the descrambler Descr of the pay-TV receiver DU is respectively communicated in time by the program distribution center CU encoded with what is referred to as a public key. This public key is calculated in the pay-TV receiver or in the program distribution center CU from a secret key that, in the latter case, the program provider prescribes for the pay-TV receiver DU. The pay-TV receiver receives the secret deciphering key, for example in the form of a chip card. In the former instance, the public key is transmitted back from the pay-TV receiver to the program distribution center CU. Encoded with the public key, the information about the initial setting of the descrambler Descr is transmitted by the program distribution center CU as, so to speak, a secondary key information. This information about the modified transmission modalities can only be decoded with the underlying secret key and, thus, can only be decoded by that pay-TV receiver DU for whom the appertaining information is intended and which, thus, possesses the secret deciphering key.

Public key methods are known in and of themselves (for example, from the article in ntz 38 (1985) 9, 636 . . . 638). They employ what are referred to as one-way functions for forming keys. One-way functions are functions whose function value is relatively simple to be calculated, whereas the calculation of the inverse is hardly possible. "Simple" and "hardly possible" thereby mean the computer outlay and are therefore dependent on the state of development of the respective computer generation. (Jansen, Pohlmann, "Kryptographie in der Telematik", ntz 38 (1985) 9, 636 . . . 638).

For example, a known public key method is thus based on the fact that it is very simple to calculate a large natural number by multiplication of a plurality of prime numbers but that it is hardly possible to again resolve this large natural number into its prime factors (Rivest, Shamir, Adleman, "A method for obtaining digital signatures and public-key crypto-systems", Communications of the ACM 21 (1978) 2, 120 . . . 126). In this known method, a crypto-text C is obtained from a plain-text M on the basis of a mathematical transformation $C=M^e (\mod n)$ the inverse transformation with which the plain-text is again obtained from the crypto-text reads $M=C^d (\mod n)$ M is a positive, whole number that must lie between 0 and n-1. The key pairs (e,n) for the public key and (d,n) for the secret key then derive. In the calculation of the key, n is first calculated as the product of two extremely large, freely selected prime numbers p and q (these numbers are generated with a random number generator and remain secret):

$$n=p \cdot q, \text{ with } p \approx q.$$

Since it leads to incredible difficulties to conversely calculate the prime numbers p and q from n, n can be published as a constituent part of the public key.

A large, freely selected, whole number (approximately 100 places in serious applications) is employed as secret key d. This must be relatively prime relative to $(p-1) \cdot (q-1)$. When p, q and d have thus been defined, then the public key e can be generated by "inverse multiplication":

$$e \cdot d (\bmod (p-1) \cdot (q-1))=1$$

Specific mathematical algorithms exist for generating prime numbers and generating keys. The possible throughput rate, however, is slight (a few zig bit/s) due to the complex calculating operations.

The initial setting of the scramblers Scr provided in the program distribution center CU and allocated to the individual pay-TV receivers DU and of the descrambles Descr provided at the pay-TV receivers DU can be repeatedly modified in that the program distribution center CU respectively calculates a random, new initial setting for the scramblers Scr allocated to the individual pay-TV receivers DU on the basis of a random number generator Z and communicates the respectively appertaining initial setting of the appertaining descrambler Descr to the appertaining pay-TV receiver DU encoded with the public key. At the appertaining pay-TV receiver DU, this message is decoded with the appertaining, secret key, whereupon the modification is implemented beginning with a specific pulse frame.

New keys can be prescribed for the pay-TV receivers DU by the program purveyor at certain time intervals, the program distribution center CU respectively calculating a new, public key for these. The program distribution center CU, after calculating a new initial scrambler setting, can then encode the appertaining initial descrambler setting with the new public key and communicate the modification of the initial setting to the appertaining pay-TV receiver DU, this modification of the initial setting being then again implemented proceeding from a specific pulse frame. It is not only the initial setting but also the structure of scrambler and descrambler that can be modified at regular or irregular time intervals in order to make unauthorized eavesdropping more difficult. On the other hand, the public key can also be calculated in the pay-TV receiver and can be transmitted back to the program distribution center CU.

The crypto-equipment S indicated in the program distribution center CU in FIG. 1 can be implemented in and of itself in the form of digital arithmetic units in a known way, so that further explanations directed thereto are not required here; the same is true, as warranted, for crypto-equipment in the pay-TV receivers.

Figure 2:
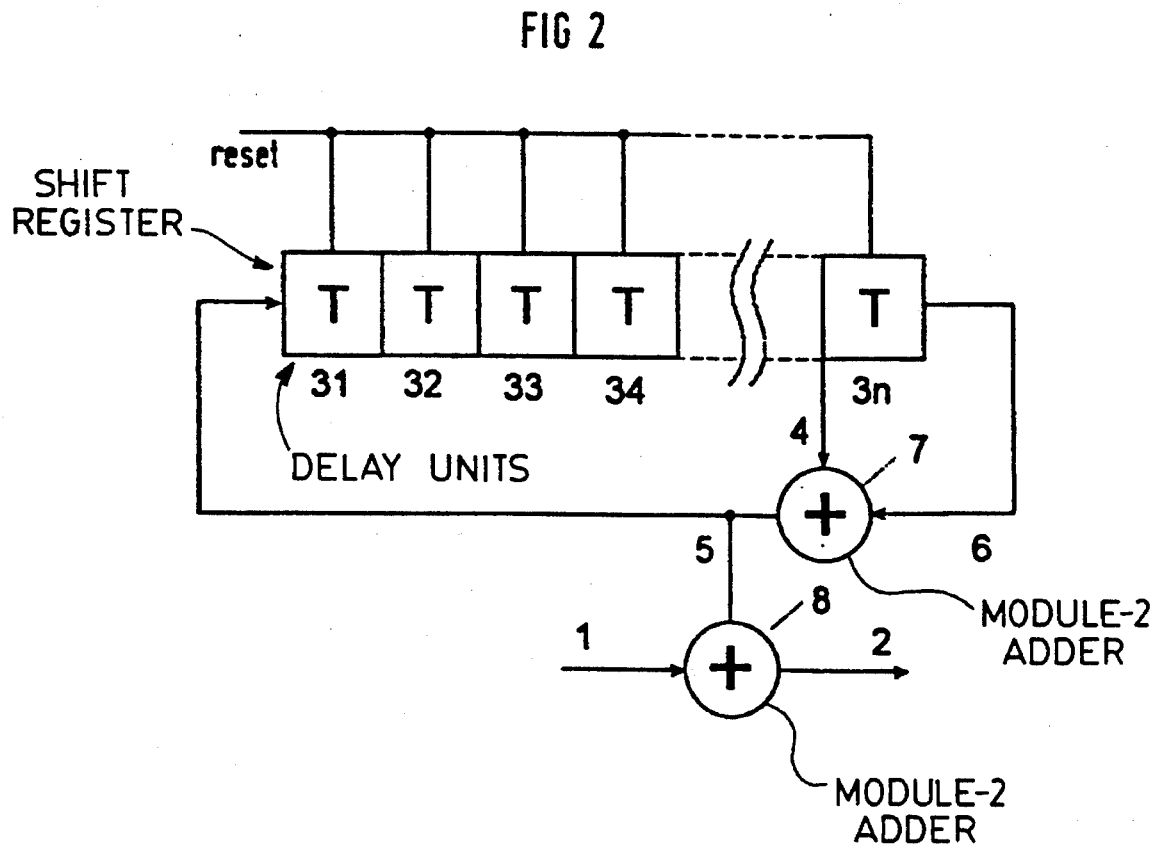
FIG. 2 shows an exemplary embodiment of a scrambler or, respectively, descrambler.

FIG. 2 shows an additive scrambler. It is composed of a shift register having delay units $31 \ldots 3n$, of a module-2 adder 7 and of a further module-2 adder 8. The output 6 of the last shift register cell $3n$ and at least one output of a further shift register cell, the output 4 of the penultimate cell in the illustrated example, are connected to the inputs of the module-2 adder 7. The output 5 thereof is connected to the input of the first shift register cell 31. The shift register is supplied with the system clock via a clock line (not shown). Given an expedient selection of the length of the shift register and of the position of the tap 4, the arrangement which has been set forth now generates what is referred to as a random sequence having the maximum length $2^n-1$. More than two outputs of the shift register can also be connected to the module-2 adder 7. The possibilities for an expedient selection of the taps in order to obtain a random sequence of maximum length are set forth and tabulated in detail in the literature. For example, n=15 could be selected.

The quasi-random sequence generated in this way is supplied to the input of a further module-2 adder 8. The other input 1 thereof is supplied with the data signal to be scrambled, whereby both signals are synchronously present at the module-2 adder 8 with the same clock. The data signal is now module-2 added bit-by-bit to the random sequence and is thus modified and protected against inadmissible eavesdropping as long as the eavesdropper does not know the structure of the scrambling, quasi-random sequence and the phase relation thereof.

The decoding in the descrambler ensues with exactly the same arrangement as shown in FIG. 2. Another in-phase module-2 addition of the same quasi-random sequence again produces the original signal, since X (mod2) Y (mod2) Y=X.

In order to be able to synchronize the scrambler and descrambler to the random sequence in phase, the shift register must be placed in a defined condition at specific, declared points in time. This can ensue via the reset line "reset" which, for example given ATM transmission, sets all shift register contents to "1" at the beginning of the information field of each and every ATM cell or to another specific prescribed initial combination. This initial combination is known at the transmission side and is also known at the reception side after its transmission with the public key method. The setting of the initial setting ensues identically in the scrambler and descrambler.

A stationary scrambler would not yet offer the necessary protection against unauthorized eavesdropping. Since the quasi-random sequence repeats after $2^n-1$ clocks and since pauses in the data signal lead to the fact that the quasi-random sequence itself is transmitted, an unauthorized individual could identify these and employ them for decoding the further data flow. The scrambling random sequence is therefore modified at regular or irregular time intervals. An arrangement suitable for this purpose which, so to speak, combines scrambler Scr (in FIG. 1) and random generator Z (in FIG. 1) is shown in FIG. 3.

FIG. 3 again shows a shift register, here referenced $41 \ldots 4n$. In addition to the output 6 of the last shift register cell, outputs $51, \ldots, 5 (n-1)$ can be optionally connected to further inputs of the module-2 adder 7. The structure of the feedback shift register and, thus, the length and structure of the resulting quasi-random sequence can thus be arbitrarily varied. In addition, the initial content of the shift register can be arbitrarily preset by setting the contents of the shift register cells with the switches $21 \ldots 2n$. An exclusive zero string is merely to be avoided, since no quasi-random sequence would arise in this case. In practice, the switches are realized by electronic gate circuits.

The control of the switches $21 \ldots 2n$ and $51 \ldots 5 (n-1)$ ensues via a control bus 11 which is supplied by an arithmetic unit 9 (such as a microprocessor. At the transmission side, the arithmetic unit 9 defines the respective structure (via the switches $51 \ldots 5 (n-1)$) and the initial setting of the shift register (via the switches $21 \ldots 2n$) on the basis of a table whose use can in turn be controlled by a random generator. The arithmetic unit 9 defines the chronological duration for which this setting is to be valid until the next change or, respectively, given ATM transmission, the plurality of cells to be scrambled in the future in this way.

Since these calculations can ensue slowly, they can be implemented by software with a microprocessor. The structure of such arithmetic units is well known and need not be set forth again here. The information about the structure and the initial setting of the arrangement in FIG. 3 are encoded, as set forth, with the public key method and are transmitted to the receiver.

In a point-to-multipoint system, these procedures proceed independently of one another for every individual connected subscriber.

At the reception side, a corresponding arithmetic unit receives the necessary information from the computer of the reception side via the line 10, which evaluates the public key transmission and the information intended for it. In addition, an information is transmitted regarding the moment at which a new structure and initial setting is to be set for the descrambler of the receive side. Given ATM transmission, for example, the ATM cells can be continuously numbered for this purpose and the receiver is informed about the cell number beginning with which the new settings are valid. Another possibility is the insertion of a synchronization cell, which marks that the new setting of the descrambler is valid for all following cells. To this end, it is necessary that the transmitted cells arrive in the receiver in the proper sequence. This is the case with extremely high probability, often with reliability in real networks.

Given calculating time that is still available, the arithmetic unit 9 can also be co-utilized for identifying the public key, so that a separate computer (R in FIG. 1) is not required for this purpose. The analogous case is also true of the decoding means S indicated in FIG. 1, whose function can likewise be co-assumed by the arithmetic unit 9 given free calculating time.

In conclusion, let the following also be pointed out. When the present invention is utilized in a passive optical telecommunication system wherein, in accord with an initially cited method (known from German reference DE-C1-42 04461), the initial setting and/or the structure of scramblers provided in a centralized telecommunication equipment and allocated to decentralized equipment and of descramblers provided in the decentralized equipment is repeatedly modified at the frame beginning. In this case the central communication means respectively calculates a random, new initial setting and/or structure for the scramblers allocated to the individual decentralized equipment on the basis of a random number generator and informs the appertaining decentralized equipment of the appertaining initial setting and/or structure of the appertaining descrambler coded with a public key communicated from the respective decentralized equipment. The appertaining decentralized equipment decodes this communication with the appertaining secret key, whereupon the modification is implemented beginning with a specific pulse frame. In this optical telecommunication system it could occur in rare instances that an additional scrambler provided for the transmission in the passive optical telecommunication system just cancels the effect of the scrambler provided according to the present invention. This can be avoided, on the one hand, in that ATM cells that are already scrambled are specially identified (for example, at a suitable location in the header, in the first bits of the information field, with a discriminating digit in the VPI field or the like) and are not scrambled again in the passive optical telecommunication system; since, on the other hand, the subscriber generally knows that he is to receive scrambled information from the cooperating party another scrambling in the passive optical telecommunication system can also be suppressed by a message proceeding from the subscriber.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for data security in a digital telecommunication system having central telecommunication equipment and a plurality of decentralized telecommunication equipment, signal transmission proceeding from the central telecommunication equipment to the decentralized equipment of the plurality of decentralized equipment on the basis of asynchronous transmission mode (ATM) cells, comprising:

installing a secret key in a pay-TV receiver; and for pay-TV distribution with ATM, using a public key, which fits the secret key installed at the pay-TV receiver, in a program distribution center for scrambling information for adapting the pay-TV receiver to transmission modalities that are repeatedly modified and that are determined in the program distribution center for the pay-TV receiver, wherein said program distribution center is the central telecommunication equipment and the pay-TV receiver is a respective decentralized telecommunication equipment of the plurality of decentralized equipment.

2. The method according to claim 1, wherein a scrambler is provided in the program distribution center and a descrambler is provided in the pay-TV receiver, wherein signal transmission is provided in pulse frames, and wherein at least one of an initial setting and a structure of the scrambler in the program distribution center and of the descrambler in the pay-TV receiver is respectively repeatedly modified; wherein the program distribution center calculates at least one of a random new initial setting and a random new structure for the scrambler with a random number generator and communicates said at least one of a random new initial setting and a random new structure of the descrambler in a communication to the pay-TV receiver, said at least one of a random new initial setting and a random new structure being scrambled with the public key that fits the secret key prescribed at the pay-TV receiver, said pay-TV receiver unscrambling this communication with the secret key, whereupon the modification is implemented proceeding from a specific pulse frame.

3. The method according to claim 1, wherein the digital telecommunication system has a plurality of pay-TV receivers and wherein the transmission modalities for various pay-TV receivers of the plurality of pay-TV receivers or groups of pay-TV receivers of the plurality of pay-TV receivers are modified at different points in time.

4. The method according to claim 1, wherein the digital telecommunication system is a B-ISDN telecommunication system.

5. A method for data security in a digital telecommunication system having central telecommunication equipment and a plurality of decentralized telecommunication equipment, signal transmission proceeding from the central telecommunication equipment to the decentralized equipment of the plurality of decentralized equipment on the basis of asynchronous transmission mode (ATM) cells, comprising:

installing a secret key in a pay-TV receiver; and for pay-TV distribution with ATM, using a public key, which fits the secret key installed at the pay-TV receiver, in a program distribution center for scrambling information for adapting the pay-TV receiver to transmission modalities that are repeatedly modified and that are determined in the program distribution center for the pay-TV receiver, wherein said program distribution center is the central telecommunication equipment and the pay-TV receiver is a respective decentralized telecommunication equipment of the plurality of decentralized equipment;

providing a scrambler in the program distribution center and a descrambler in the pay-TV receiver, wherein signal transmission is provided in pulse frames;

repeatedly modifying at least one of an initial setting and a structure of the scrambler in the program distribution center and of the descrambler in the pay-TV receiver;

calculating in the program distribution center at least one of a random new initial setting and a random new structure for the scrambler with a random number generator; and communicating said at least one of a random new initial setting and a random new structure of the descrambler in a communication to the pay-TV receiver, said at least one of a random new initial setting and a random new structure being scrambled with a public key that fits the secret key prescribed at the pay-TV receiver, said pay-TV receiver unscrambling this communication with the secret key, whereupon the modification is implemented proceeding from a specific pulse frame.

6. The method according to claim 5, wherein the digital telecommunication system has a plurality of pay-TV receivers and wherein the transmission modalities for various pay-TV receivers of the plurality of pay-TV receivers or groups of pay-TV receivers of the plurality of pay-TV receivers are modified at different points in time.

7. The method according to claim 5, wherein the digital telecommunication system is a B-ISDN telecommunication system.

8. A method for data security in a digital B-ISDN telecommunication system having central telecommunication equipment and a plurality of decentralized telecommunication equipment, signal transmission proceeding from the central telecommunication equipment to decentralized equipment of the plurality of decentralized equipment on the basis of asynchronous transmission mode (ATM) cells, comprising:

installing a secret key in a pay-TV receiver;

for pay-TV distribution with ATM, using a public key, which fits a secret key prescribed at a pay-TV receiver, in a program distribution center for scrambling information for adapting the pay-TV receiver to transmission modalities that are repeatedly modified and that are determined in the program distribution center for the pay-TV receiver, wherein said program distribution center is the central telecommunication equipment and the pay-TV receiver is a respective decentralized telecommunication equipment;

providing a scrambler in the program distribution center and a descrambler in the pay-TV receiver, providing signal transmission in pulse frames, and repeatedly modifying at least one of an initial setting and a structure of the scrambler in the program distribution center and of the descrambler in the pay-TV receiver;

determining in the program distribution center at least one of a random new initial setting and a new structure for the scrambler with a random number generator; and communicating said at least one of a random new initial setting and a random new structure of the descrambler in a communication to the pay-TV receiver, said at least one of a random new initial setting and a random new structure being scrambled with the public key that fits the secret key prescribed at the pay-TV receiver, said pay-TV receiver unscrambling this communication with the secret key, whereupon the modification is implemented proceeding from a specific pulse frame.

9. The method according to claim 8, wherein the digital telecommunication system has a plurality of pay-TV receivers and wherein the transmission modalities for various pay-TV receivers of the plurality of pay-TV receivers or groups of pay-TV receivers of the plurality of pay-TV receivers are modified at different points in time.

* * * * *